United States Patent [19]
Howard

[11] Patent Number: 5,714,053
[45] Date of Patent: Feb. 3, 1998

[54] CONDUCTING POLYMER ELECTRODES FOR ENERGY STORAGE DEVICES AND METHOD OF MAKING SAME

[75] Inventor: Jason N. Howard, Lawrenceville, Ga.

[73] Assignee: Motorola, Inc., Schaumburg, Ill.

[21] Appl. No.: 730,584

[22] Filed: Oct. 15, 1996

Related U.S. Application Data

[62] Division of Ser. No. 505,427, Jul. 21, 1995, abandoned.

[51] Int. Cl.[6] .............................. C25D 5/48; C25D 11/00; B21F 41/00; H01M 6/46
[52] U.S. Cl. .......................... 205/220; 205/317; 29/25.03; 429/152; 429/213
[58] Field of Search ............................. 429/152, 213; 29/25.03; 205/220, 317

[56] References Cited

U.S. PATENT DOCUMENTS 4,559,284  12/1985  Nishimura et al. .................. 429/213

OTHER PUBLICATIONS

Van Dyke et al, "A Simple Chemical Procedure for Extending the Conductive State of Polyprrole to More Negative Potentials", J. Electrochem. Soc., vol. 140, No. 10, pp. 2754-2759, Oct. 1993.

Primary Examiner—Kathryn L. Gorgos
Assistant Examiner—Edna Wong
Attorney, Agent, or Firm—Kelly A. Gardner; Kenneth M. Massaroni

[57] ABSTRACT

A method for making high power electrochemical capacitors (20) provides for depositing an electrically conducting polymer (24) onto a metal substrate (22). The electrically conducting polymer is initially grown in the presence of a soft anion, i.e., an anion having a high degree of polarizability. Subsequently, the polymer is treated with a relatively hard anion which at least partially replaces the soft anion in the polymer. The result is an electrochemical charge storage device which has enhanced electrochemical properties.

10 Claims, 3 Drawing Sheets

CONDUCTING POLYMER ELECTRODES FOR ENERGY STORAGE DEVICES AND METHOD OF MAKING SAME

This is a divisional application of U.S. patent application Ser. No. 08/505,427 filed on Jul. 21, 1995 now abandoned and assigned to Motorola, Inc.

TECHNICAL FIELD

This invention relates in general to electrochemical charge storage devices, and particularly to high energy density, high power density polymer electrodes for such devices.

BACKGROUND OF THE INVENTION

As electronic devices increasingly become portable, advances must be made in energy storage devices to enable such portability. Indeed it is often the case with current electronics technology that the limiting factor to portability of a given device is the size and weight of the associated energy storage device. Obviously a small energy storage device may be fabricated for a given electrical device, but at the cost of energy capacity. The result is that either the energy source is too bulky, too heavy, or it does not last long enough. The main energy storage device used for portable electronics is the electrochemical battery cell, and increasingly the electrochemical capacitor.

Electrochemical capacitors are a class of devices characterized by relatively high power densities as compared with conventional battery systems. The charge mechanism of such capacitors is typically the result of primary, secondary, tertiary, and higher order oxidation/reduction reactions between the electrodes and the electrolyte of the device.

Heretofore, such devices have typically been made with electrodes fabricated of relatively exotic or expensive materials, such as ruthenium. Electronically conducting polymers represent a promising class of materials for the development of electrochemical capacitors, common examples of which include polypyrrole (PPY) and polyaniline. High specific capacitance is obtained in these materials by doping the polymer via oxidation/reduction reactions. The simplest such devices are symmetric capacitors in which both the anode and cathode are fabricated of the same conducting polymer. Devices with different or asymmetric electrodes are also possible.

One of the major limitations to conducting polymer electrochemical capacitor devices is their inability to provide high power devices necessary for many applications. High voltage cells would have several important advantages over the current state of the art. For example, energy density per cell is higher, as demonstrated in the following formula:

$$\text{Energy} = \frac{1}{2} C V^2 = QV$$

where C is capacitance (Farads), V is the operating voltage (volts), and Q is the capacity or charge stored (Coulombs). High voltage is increasingly required for many applications. While higher voltages can be achieved by stacking a plurality of similar devices, such a stack takes up more space than is available in many portable applications. More importantly, stacked cells increase the equivalent series resistance (ESR), reducing the maximum power available from the device. Finally, such multicell stacks increase manufacturing complexity, and generate the additional step of cell balancing, i.e., selecting stacked cells so that they maintain uniform capacitance and voltage across each cell in series.

Most conventional conducting polymers, such as PPY can only be p-doped (oxidized) at relatively positive potentials. The doping process for conventional PPY begins above about $-0.7$ V versus $Ag/Ag^+$ and continues to $\geq 0.2$ V. As used herein potentials reported versus $Ag/Ag^+$ refer to potentials versus $Ag/0.01M\ AgNO_3$, 0.2 M tetraethylammonium tetrafluoroborate ($TEABF_4$), and acetonitrile. Above 0.2 V however, the material becomes over-oxidized and rapidly decomposes. Symmetric capacitors with conventional PPY electrodes are thus limited to less than 1 V. Higher voltages can be achieved using asymmetric electrodes such as PPY and polythiophene (PTH). Since PTH has a higher oxidation limit, devices with a PPY anode and a PTH cathode can reach 1.5 V. See Rudge, et al., *J. Power Sources*, 47 (1994) 89.

Recent work in the field has developed a chemical preparation treatment for PPY which extends its electrochemical activity to much more negative potentials. See Van Dyke, et al., *J. Electrochem. Soc.* 140 (1993), 2754. By treating PPY films with hydroxide solution, the doping process is extended to about 1.5 V versus $Ag/Ag^+$, which represents an extension to more negative potentials, rather than simply shifting the electrochemical performance window. FIG. 1 illustrates a cyclic voltammagram of the enhanced electrochemical performance of modified PPY (line 12) versus the performance of conventional PPY (line 14).

Accordingly, there is a need for high power electrochemical capacitor devices which are fabricated with inexpensive conducting polymers, and which possess high voltage performance.

DETAILED DESCRIPTION OF THE PREFERRED EMBODIMENT

Figure 1:
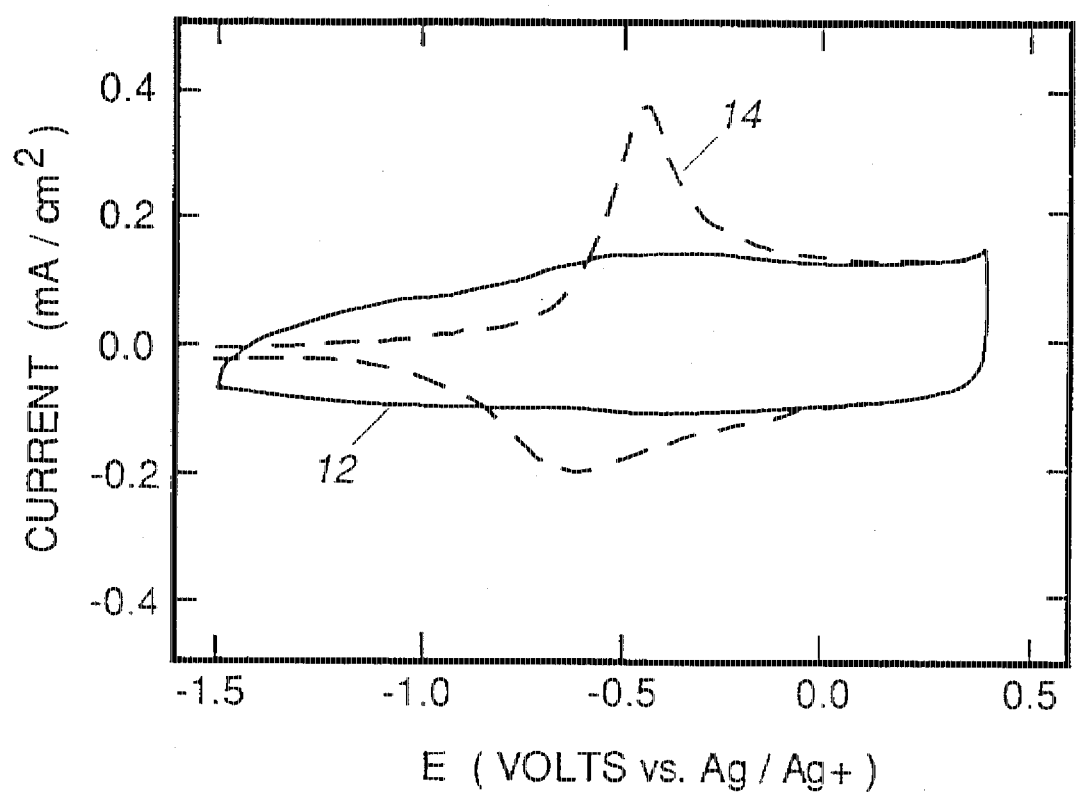
FIG. 1 is a cyclic voltammagram of the electrochemical performance of modified PPY versus the performance of conventional PPY.

While the specification concludes with claims defining the features of the invention that are regarded as novel, it is believed that the invention will be better understood from a consideration of the following description in conjunction with the drawing figures, in which like reference numerals are carried forward.

Figure 2:
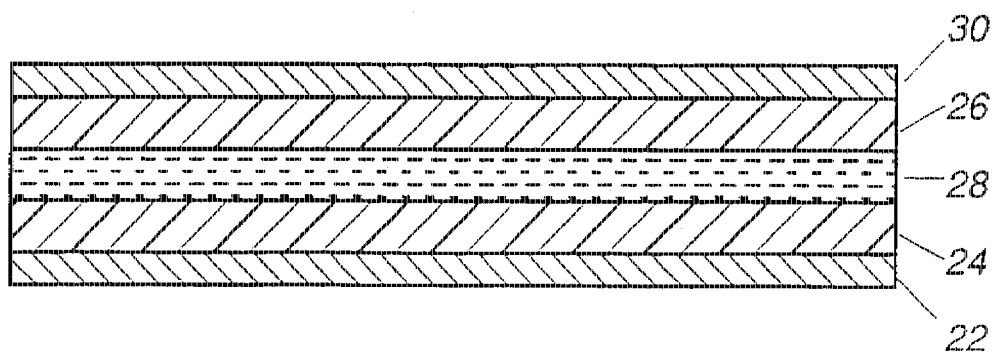
FIG. 2 is a cross-sectional side view of a single-cell electrochemical charge storage device in accordance with the instant invention.

Referring now to FIG. 2, there is illustrated therein a cross sectional side view of a single cell electrochemical charge storage device, such as an electrochemical capacitor, in accordance with the instant invention. In the embodiment in which both of the electrodes are fabricated of the same materials, the device is said to have "symmetric" electrodes. Alternatively, devices such as that disclosed in FIG. 2 may have a first electrode fabricated of a first material and a second electrode fabricated of a second material. In such a device, the electrodes are referred to as being "asymmetric".

The device 20 includes a current collecting substrate 22 which may be fabricated of a number of materials including, for example, noble metals such as gold, silver, or platinum, or a number of non-noble metals or materials, examples of which include, zinc, titanium, stainless steel, copper, nickel, iron, lead, tin, indium, tungsten, aluminum, bismuth, molybdenum, niobium, magnesium, manganese, carbon, graphite, alloys of the same, and combinations thereof. The substrate 22 may further be coated with a layer of adhesion enhancing material so as to enhance the adhesion between the substrate and the layers which are deposited thereover. An example of an adhesion enhancing material appropriate for use in such a cell is disclosed in, for example, U.S. patent application Ser. No. 08/641,716, filed May 2, 1996, in the name of Li, et al, the disclosure of which is incorporated herein by reference. The substrate 22 is typically fabricated to a thickness of between 10 microns and 500 microns and preferably about 25-75 microns in thickness. The substrate may be either a metal foil, a mesh, or a metallized cloth.

Disposed on the substrate 22 are layers of enhanced surface area electrode materials. As described hereinabove, the electrodes may be either symmetric or asymmetric and are preferably fabricated of electrically conducting polymers. The electrodes 24, 26, are electrically conducting polymer layers which may be fabricated from any of a number of known polymers, examples of which include polyaniline, polypyrrole, polythiophene and their derivatives, and other n-doped and p-doped conductive polymers. The layers of electrically conducting polymers are typically deposited by electrochemical depositions via a process described in greater detail hereinbelow, to a thickness of between 0.1 and 5.0 micrometers and preferably about 1.0 microns.

More specifically, in the case where at least one of the electrodes is formed of an electrically conductive polymer, said electrode (for example, electrode 24) is fabricated of, for example, PPY which is formed by constant current electrolysis between the substrate 22 and a counter electrode. The typical technique for electrolysis formation of such materials includes preparing a solution of the PPY in the presence of a "soft anion" while a current is supplied across the counter electrode and the substrate. Soft anions are understood in the field to refer to ions which are relatively large and highly polarizable. A soft anion typically used in the fabrication of a PPY electrode is tetrafluoroborate ($BF_4^-$), however, other soft anions such as $PF_6^-$, $AsF_6^-$, $ClO_4^-$, and $CF_3SO_3^-$ may also be used advantageously in the fabrication of electrically conducting polymers.

After the PPY electrode has been formed, any remaining polymer solution between the substrate and the counter electrode may be removed. The PPY electrode so formed is then treated with a second solution including a "hard" anion. Hard anions are understood to refer to relatively small and highly electronegative ions, i.e., ions with a low degree of polarizability, examples, of which include $OH^-$, $F^-$, $SO_4^-$, $NO_3^-$, $Cl^-$, methoxides, and combinations thereof. In one preferred embodiment, the PPY electrode (or other conducting polymer electrode) is exposed to a solution of NaOH, wherein $OH^-$ is the hard anion. As the PPY electrode is exposed to the hard anion at least some of the soft anions which were incorporated into the conducting polymer electrode are replaced with some of the hard anions so as to modify the electrochemical behavior of the PPY electrode.

The electrochemical mechanism described in the previous paragraphs can also be understood in terms of solvation of ions. More specifically, solvation of ions by the non-aqueous electrolyte is believed to be an important mechanism in the fabrication of the PPY electrode. For example, acetonitrile tends to solvate "soft" ions to a much greater degree than hard ions. Ions which are strongly solvated by non-aqueous electrolytes include $BF_4^-$, $PF_6^-$, $I^-$, $AsF_6^-$, $CF_3SO_3^-$, $CO_4^-$, $SCN^-$, and imides in general. Ions poorly solvated by polar aprotic solvents include $F^-$, $OH^-$, $Cl^-$, $SO_4^{2-}$, $NO_3^-$, $PO_4^{3-}$, and $CO_3^{2-}$ to name a few. Accordingly, the treatment of the PPY electrode may be understood from the standpoint of solvation, as well as substitution of soft anions by hard anions.

As noted above, the second electrode 26 may be fabricated of a similar electrically conductive polymer and hence would be fabricated in the same way. Alternatively, in the embodiment in which the device 20 includes asymmetric electrodes, second electrode 26 would be fabricated of a different material which may or may not be prepared by a process similar to that described hereinabove.

Disposed between electrode layers 24 and 26 is a layer of a separator electrolyte 28. The electrolyte layer may be aqueous, or non-aqueous and is preferably polymer gel electrolytes comprising a polymer matrix and an electrochemically active ionic component including salts, acids, or bases. A liquid plasticizer may also be present. The polymer matrix may be selected from the group of polymers including: polyvinyl alcohol, polyethylene oxide, polyacrylimide, polyurethane, poly-2-vinylpuridene, polyisoethinanaphthene, and combinations thereof. In one preferred embodiment, the electrolyte include the polymer matrix of polyurethane, with $TEABF_4$/propylene carbonate as the electrochemically active material. A second current collecting layer 30 is disposed atop the second electrode, and is fabricated of a material as described above for substrate 22.

Figure 3:
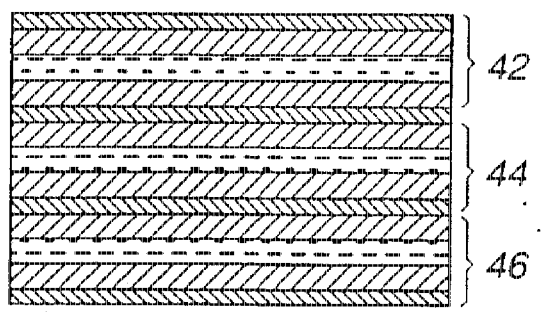
FIG. 3 is a cross-sectional side view of a multicell electrochemical charge storage device in accordance with the instant invention.

Referring now to FIG. 3, there is illustrated therein a cross sectional side view of a multi-cell electrochemical charge storage device, such as a capacitor, in accordance with the instant invention. The device 40 of FIG. 3 includes three devices, such as 20 of FIG. 2, arranged in stacked configuration. The three devices 42, 44, 46, are arranged such that the separator/electrolyte layers of each are in contact with one another. It will occur to one of ordinary skill in the art, that the separator/electrolyte of, for example, device 44 may be common with the separator/electrolyte of adjacent devices 42 and 46. In this way, the overall thickness of the device 40 may be reduced. It will further occur to one of ordinary skill that while FIG. 3 illustrates only three devices in stacked arrangement, any number of such devices can be accumulated to increase the voltage of the device.

The fabrication and performance of devices according to the instant invention can be better understood from a perusal of the example which follows.

EXAMPLE I

Test cells were prepared to evaluate the electrochemical performance of a capacitor fabricated with symmetric PPY electrodes of conventional processing as compared to a similar device in which the PPY has been modified. A T-cell design was used, and was assembled as follows:

Conventional PPY Cell

One mm thick gold substrates were pressed against opposite sides of the T-cell joint interior by a steel rod. The exposed area of the gold substrates was approximately 0.5 $cm^2$. With the substrates in place, the cell was filled with an acetonitrile solution containing about 0.5 M PPY, 0.5 M, $H_2O$, and 0.2 M $TEABF_4$. A high surface area platinum electrode was added to the third port of the T-cell. The cell was then degassed for approximately 10 minutes by purging the solution with nitrogen gas.

Polypyrrole was formed by constant current electrolysis between each gold substrate and the platinum counter electrode. The applied current was at 0.5 mAmps oxidizing current for 60 sec. (1 mA/cm$^2$ 60 mC/cm$^2$ total charge passed). The conventional PPY cell was then thoroughly rinsed with acetonitrile and stored in a helium filled glove box.

Modified PPY Cell

A second cell was fabricated as described hereinabove with respect to the conventional PPY cell. However, after the PPY electrode was formed by constant current electrolysis, and thoroughly rinsed with acetonitrile, the cell was drained and refilled with degassed 0.2 molar NaOH (AQ) solution for ten minutes. Nitrogen gas was continuously bubbled through the cell during this ten minute period. The cell was drained and thoroughly rinsed with de-ionized water followed by acetonitrile. The cell was then placed in the helium glove box along with the conventional cell. Both cells were left under vacuum for 1½ days to remove trace moisture from the PPY electrodes and the cell body. The cells were then brought into a glove box for electrochemical testing.

Electrochemical Testing

Both the conventional and the modified PPY cells were rinsed and filled with anhydrous 0.2 molar TEABF$_4$/acetonitrile electrolyte. An Ag/Ag$^+$ reference electrode and platinum wire were inserted into the third port of the T-cell. These two auxiliary electrodes were used to obtain potential cyclic voltammagrams of the PPY electrodes. Indeed, the cyclic voltammograms illustrated in FIG. 1 hereof show a comparison of the CV's obtained for the modified and conventional PPY-electrodes. The increased electrochemical activity at negative potentials for the modified PPY electrodes is to be specifically noted. Integration of the current and the CVs show the total capacity of each electrode to be approximately 4–8 mC/cm$^2$. Since only half of this capacity is realized with this electrode is cycled in the symmetric cell, the expected cell capacities are between 2–4 mC/cm$^2$.

Cell Testing

Figure 4:
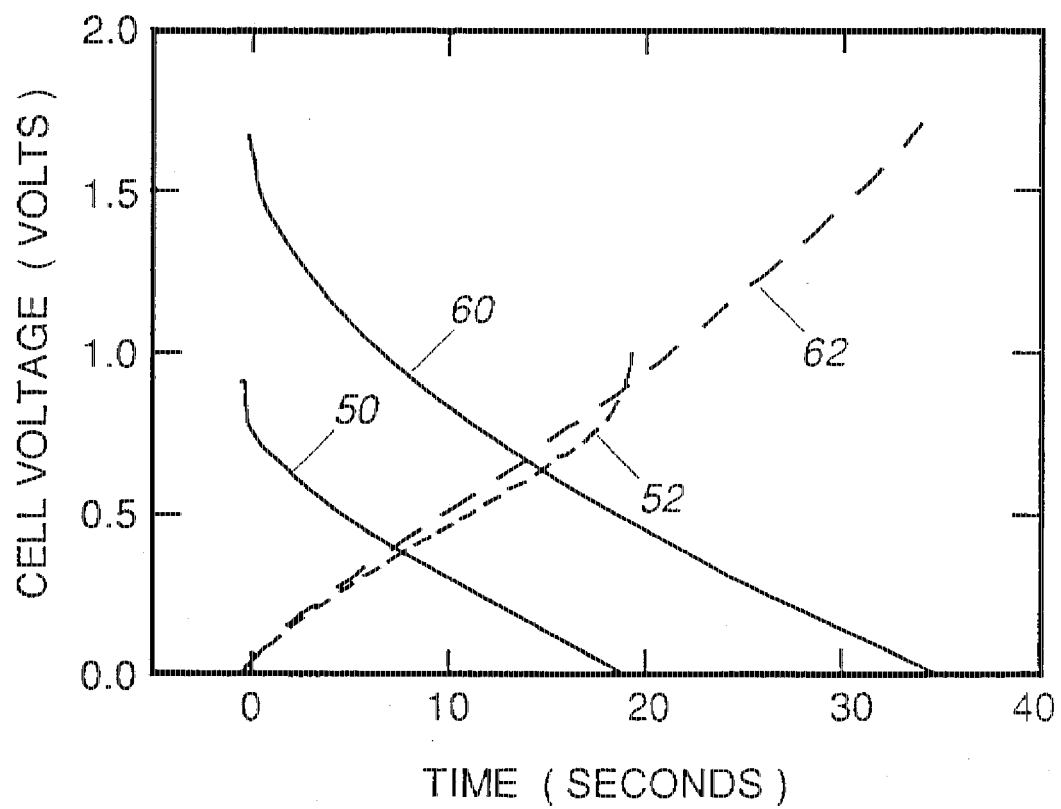
FIG. 4 is a series of charge/discharge curves comparing the performance of symmetric modified PPY cells versus symmetric conventional PPY cells.

Following the cyclic voltammagram experiments, the PPY anode and cathode were individually charged to +0.2 volts and −1.0 volt using the Ag/Ag$^+$ and PT auxiliary electrodes. The conventional PPY electrodes were then connected to a cell cycling apparatus. The initial open circuit voltage for the conventional fabricated cell was approximately 0.8 volts. Individual charge and discharge curves from 0 to 1 volt are shown in FIG. 4 at lines 50 and 52 respectively. The conventional cell had a fairly linear sloped profile expected from an ideal capacitor. The measured capacitance was 1.9 mC/cm$^2$ which is close to the predicted value. Monitoring the open circuit voltage of the cell following the charge of 1 volt shows a very rapid decay to about 0.8 volt. This, coupled with the sharp upturn in the charge/discharge curves which occur near 0.8 v suggest that little energy is stored above this potential for the conventional PPY device. Using a digital multimeter, the potential of each PPY electrode can be measured versus the Ag/Ag$^+$ electrode to determine where each electrode performs relative to its cyclic voltammagram profile during cell cycling. The approximate potentials of the anode and cathode with respect to the different cell potentials are shown below in Table 1.

TABLE 1

| $\Delta E_{cell}$ | $E_{anode}$ | $E_{cathode}$ |
| --- | --- | --- |
| 0 V | −0.27 V | −0.27 V |
| 1 V | −0.8 V | +0.2 V |
| 0.8 | −0.6 V | +0.2 |

Wherein $\Delta E_{cell}$ represents the measured voltage difference between the PPY anode and cathode; $E_{anode}$ and $E_{cathode}$ are the measured potentials of each PPY electrodes versus the Ag/Ag$^+$ electrode; and wherein the difference of $E_{cathode}$ and $E_{anode}$ should equal the measured $\Delta E_{cell}$.

Modified PPY

Again, the anode and cathode were individually charged before conducting cell cycling experiments. In this case, the anode was charged to −1.5 volts and the cathode to +0.2 volt versus Ag/Ag$^+$. The modified PPY cell was then cycled between 0 and 1.7 volts. These results are shown on FIG. 4 at lines 60 and 62. The charge and discharge curve profiles suggest capacitor like behavior, however, in this case, the capacity is 3.6 mC/cm$^2$ and close to the predicted value of 4 mC/cm$^2$. Anode and cathode potentials versus Ag/Ag$^+$ are shown in Table 3 hereinbelow, wherein the values are as described hereinabove with respect to Table 2.

TABLE 2

| $\Delta E_{cell}$ | $E_{anode}$ | $E_{cathode}$ |
| --- | --- | --- |
| 0 V | −0.5 V | −0.5 V |
| 1.67 V | −1.5 V | +0.17 V |
| 1.5 | −1.3 V | +0.2 V |

Comparing this data with the CV data of FIG. 1, shows that the electrode still has significant electrochemical activity at potentials near 1.5 volts versus Ag/Ag$^+$. While both the conventional and modified PPY devices have an $E_{cathode}$ which is about 0.2 volts in the fully charged cell, $E_{anode}$ and the modified PPY device is 0.9 volts more negative than in the conventional system (−1.5 v. 0.6 volts). Thus, the potential of the anode is extended to significantly lower potentials through the chemical treatments/modifications of the PPYs as described hereinabove. As a result, capacitors fabricated in this manner will possess electrochemical characteristics which are substantially more desirable than those available in the prior art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of fabricating an electrochemical capacitor including a substrate, and at least two electrodes, said method comprising the steps of:

forming a first of the at least two electrodes on said substrate via constant current electrolysis of an electrically conducting polymer in contact with a soft anion;

treating the first electrode with a solution including a hard anion to introduce said hard anion into said electrically conducting polymer, and assembling said at least two electrodes, an electrolyte layer, and said substrate to form the electrochemical capacitor.

2. A method as in claim 1, wherein said electrically conducting polymer is selected from the group consisting of polypyrrole, polyaniline, polythiophene, and combinations thereof.

3. A method as in claim 1, wherein said soft anion is selected from the group consisting of $BF_4^-$, $PF_6^-$, $AsF_6^-$, $CF_3SO_3^-$, and combinations thereof.

4. A method as in claim 1, wherein said hard anion is selected from the group consisting of $OH^-$, $F^-$, $SO_4^-$, $NO_3^-$, $Cl^-$, and combinations thereof.

5. A method as in claim 1, wherein both of said electrodes are fabricated of said electrically conductive polymer.

6. A method as in claim 1, wherein said electrically conductive polymer is polypyrrole, said soft anion is $BF_4^-$, and said hard anion is $OH^-$.

7. A method as in claim 1, including the further step of arranging a plurality of such capacitors in a stacked configuration.

8. The method of claim 1, wherein the assembling step comprises the steps of:
forming a second of the at least two electrodes on another substrate; and
disposing the electrolyte layer between the first and second electrodes to form the electrochemical capacitor.

9. A method of fabricating an electrochemical capacitor including first and second current collecting substrates and first and second electrodes, said method comprising the steps of:
forming the first electrode on the first current collecting substrate via constant current electrolysis of an electrically conducting polymer in contact with a soft anion;
treating the first electrode with a solution including a hard an_ion to introduce the hard anion into the electrically conducting polymer;
forming the second electrode on the second current collecting substrate; and
disposing a layer of electrolyte between the first and second electrodes to form the electrochemical capacitor.

10. The method of claim 9, wherein the step of forming the second electrode comprises the steps of:
forming the second electrode on the second current collecting substrate via constant current electrolysis of an electrically conducting polymer in contact with a soft anion; and
treating the second electrode with a solution including a hard anion to introduce the hard anion into the electrically conducting polymer.

* * * * *